United States Patent [19]

Suzuki et al.

[11] Patent Number: 5,316,844
[45] Date of Patent: May 31, 1994

[54] MAGNETIC RECORDING MEDIUM COMPRISING AN ALUMINUM ALLOY SUBSTRATE, NOW MAGNETIC UNDERLAYERS, MAGNETIC LAYER, PROTECTIVE LAYER, PARTICULATE CONTAINING PROTECTIVE LAYER AND LUBRICANT LAYER

[75] Inventors: Hisanori Suzuki, Sunnyvale; Takeo Matsudaira, Cupertino, both of Calif.

[73] Assignee: Hoya Electronics Corporation, San Jose, Calif.

[21] Appl. No.: 766,968

[22] Filed: Sep. 26, 1991

Related U.S. Application Data

[63] Continuation of Ser. No. 509,558, Apr. 16, 1990, abandoned.

[51] Int. Cl.$^5$ ................................................ G11B 5/00
[52] U.S. Cl. ..................................... 428/323; 428/328; 428/331; 428/336; 428/409; 428/641; 428/646; 428/650; 428/651; 428/658; 428/660; 428/662; 428/663; 428/664; 428/666; 428/667; 428/611; 428/900; 428/928; 428/694 SG; 428/694 TR; 428/694 TS; 428/694 TP
[58] Field of Search ............... 428/694, 695, 900, 611, 428/64, 65, 323, 328, 331, 336, 409, 641, 642, 646, 650, 651, 652, 654, 658, 660, 666, 667, 662, 663, 664, 694 SG, 694 TR, 694 TS, 694 TP

[56] References Cited

U.S. PATENT DOCUMENTS

| | | | |
|---|---|---|---|
| 3,520,664 | 7/1970 | York | 428/621 |
| 4,254,189 | 3/1981 | Fisher | 428/626 |
| 4,529,659 | 7/1985 | Hishino et al. | 428/422 |
| 4,560,624 | 12/1985 | Güttner et al. | 428/632 |
| 4,610,911 | 9/1986 | Opfer et al. | 428/213 |
| 4,624,892 | 11/1986 | Ishizaki et al. | 428/323 |
| 4,647,494 | 3/1987 | Meyerson et al. | 428/216 |
| 4,664,963 | 5/1987 | Sakai et al. | 428/142 |
| 4,666,754 | 5/1987 | Arioka et al. | 428/141 |
| 4,756,967 | 7/1988 | Hashimoto et al. | 428/336 |
| 4,816,334 | 3/1989 | Yokoyama et al. | 428/336 |
| 4,824,539 | 4/1989 | Komoda et al. | 204/192.2 |
| 4,828,905 | 5/1989 | Wada | 428/213 |
| 4,833,020 | 5/1989 | Shiroishi et al. | 428/336 |
| 5,029,317 | 7/1991 | Kawai et al. | 360/131 |

FOREIGN PATENT DOCUMENTS 61-073227 4/1986 Japan.
61-732227 4/1986 Japan.

Primary Examiner—Stevan A. Resan
Attorney, Agent, or Firm—Heller, Ehrman, White & McAuliffe

[57] ABSTRACT

A magnetic recording medium for contact recording has a layered structure sequentially with a substrate made of an aluminum alloy having a maximum surface roughness $R_{max}$ between 100 Å and 300 Å and having no surface protrusions or unevenness higher than 760 Å, a magnetic layer formed thereon by sputtering through underlying layers of Tiw film and Cr film, a non-magnetic first protective film formed by sputtering, a second protective film having hard particulates with average diameter 50–300 Å dispersed in an inorganic oxide film, and a lubricant film. The second protective film is formed by applying a solution containing both an organic compound and the particulates and subjecting it to a heat treatment. The medium has a maximum surface roughness of 100–300 Å and no surface protrusions or unevenness high than 760 Å and is usable for contact recording with a recording head having flying height of less than 760 Å.

18 Claims, 2 Drawing Sheets

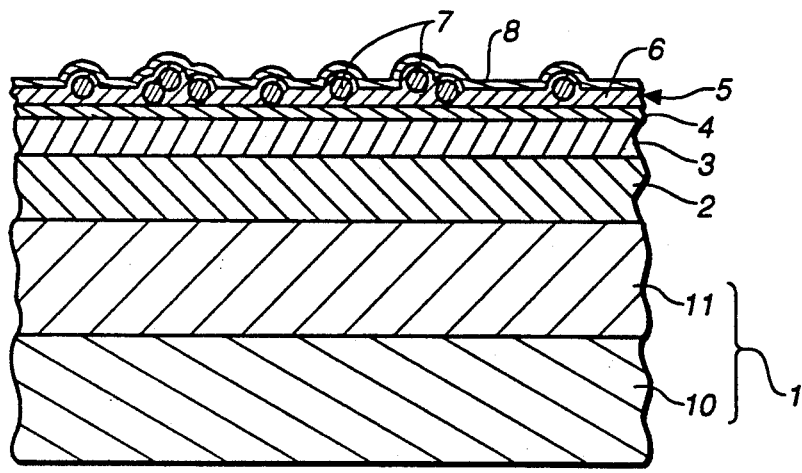
FIG._1
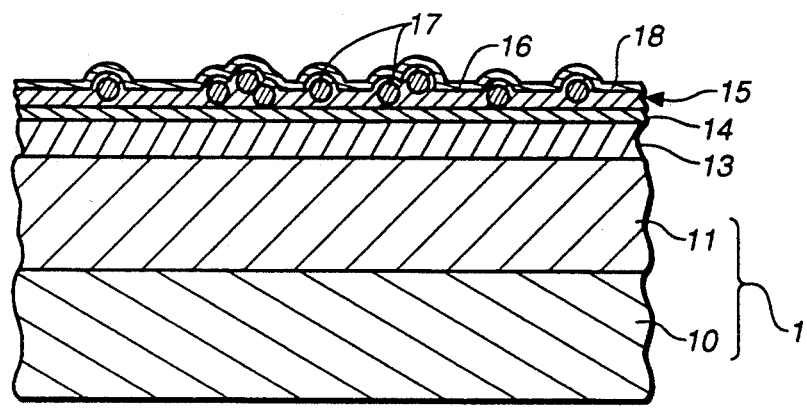
FIG._2
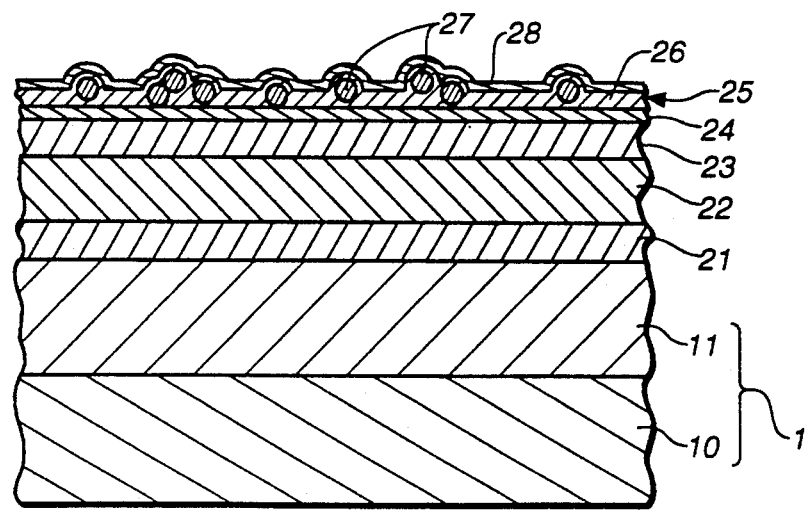
FIG._3

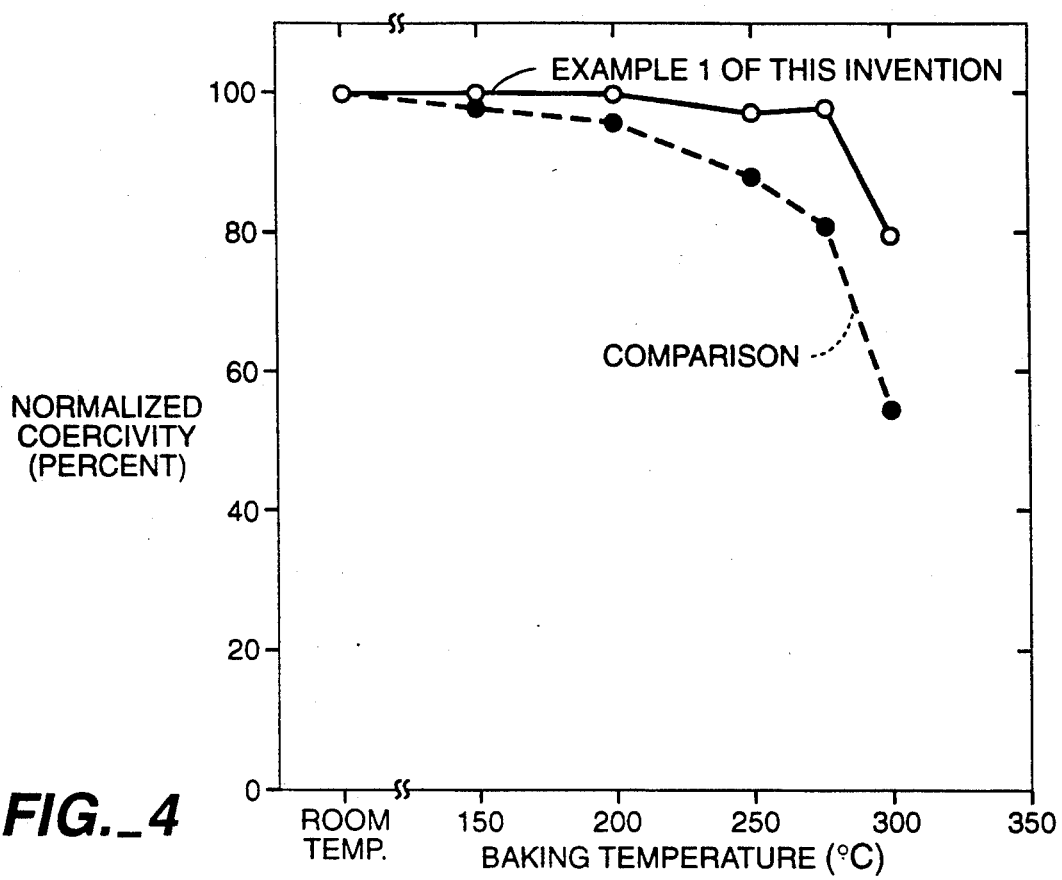
FIG._4
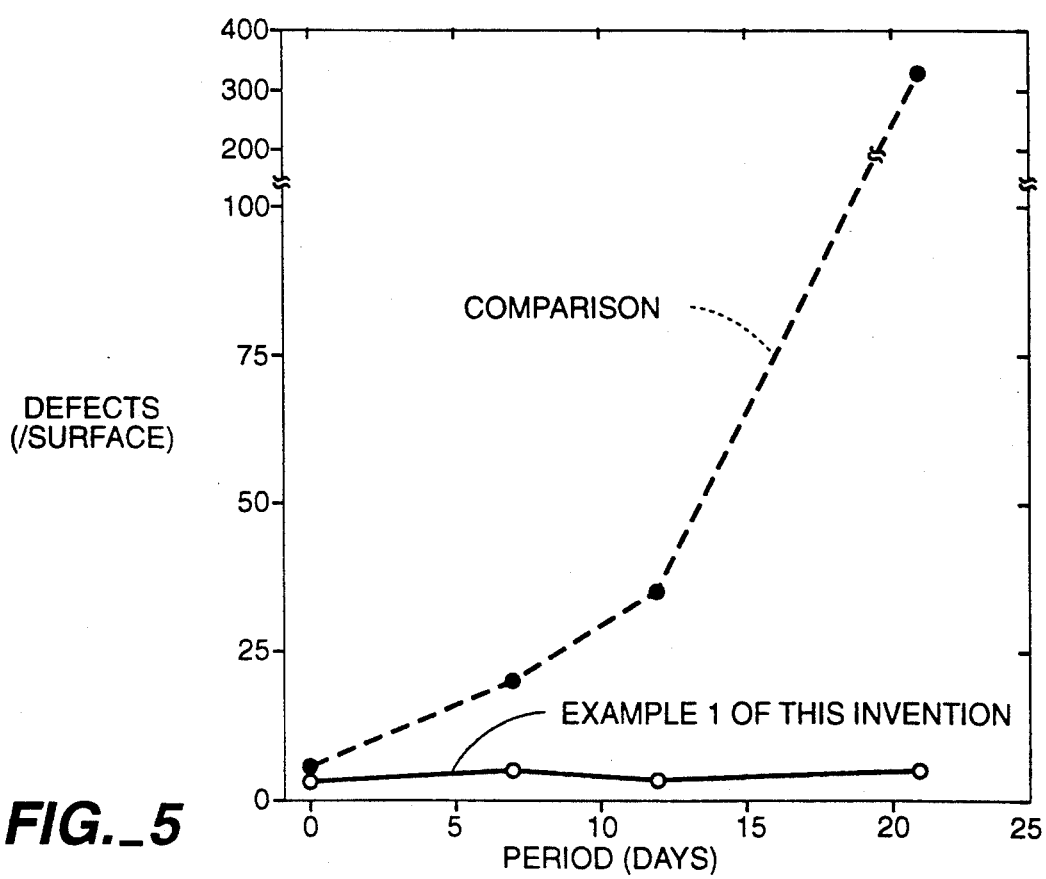
FIG._5

MAGNETIC RECORDING MEDIUM COMPRISING AN ALUMINUM ALLOY SUBSTRATE, NOW MAGNETIC UNDERLAYERS, MAGNETIC LAYER, PROTECTIVE LAYER, PARTICULATE CONTAINING PROTECTIVE LAYER AND LUBRICANT LAYER

This is a continuation of application Ser. No. 07,509,558, filed Apr. 16, 1990, now abandoned.

BACKGROUND OF THE INVENTION

This invention relates to a magnetic recording medium such as a magnetic recording disc for contact recording.

High recording densities are recently being required of magnetic recording devices. In order to achieve a high recording density, both the linear and track densities must be improved. The linear density is related to the so-called flying height of the head for recording and reproducing such that the flying height must be reduced in order to increase the linear density. The flying height of a head for the commercially available magnetic recording disc drive currently having the largest linear density is about 1500 Å. In order to achieve still higher recording densities, there have been attempts to operate the head in contact, or nearly in contact, with the recording disc during read and write operations. Such a read-write method is referred to as contact recording whereby the head occasionally comes into contact with a part of a magnetic disc for recording and reproducing while the latter rotates at a specified speed. Such a read-write method requires a new type of magnetic discs with improved mechanical durability and improved uniformity in the surface conditions. The flying height of the head is less than about 760 Å (3 microinches) and even if the disc surface is ideally flat, the slider part of the head may come to touch the disc surface due to the vibrations of the actuator or an external shock when the head seeks over the disc. The probability of such an occurrence is particularly high if the average flying height is less than 760 Å. For this reason, the contact recording may be characterized by the range of flying height of the head less than 760 Å.

Japanese Patent Publication Tokkai 52-20804 discloses a magnetic recording medium obtained by forming a non-magnetic layer of Ni-P on a substrate of an aluminum alloy, a magnetic layer of Co-Ni-P on this non-magnetic layer, and thereafter a protective layer of polysilicate by coating the magnetic layer with a tetrahydroxy silane solution and then subjecting it to a heat treatment. Japanese Patent Publication Tokkai 61-73227 discloses another magnetic recording medium obtained by forming a non-magnetic layer of Ni-P on an aluminum substrate, a magnetic layer of Co-Ni-P on this non-magnetic layer, a protective layer of polysilicate with hard particulates dispersed therethrough by coating the magnetic layer with a tetrahydroxy silane solution containing these particulates and subjecting it to a heat treatment, and then a lubricant layer comprising perfluoro polyether on this protective layer. More recently, Japanese Patent Application Tokugan 01-138095 disclosed a recording medium which is produced by sequentially forming a magnetic layer and a protective layer on a substrate of a glass or ceramic material and is characterized wherein the surface roughness ($R_{max}$) of the substrate is less than 100 Å.

One of the most important requirements to be satisfied by a recording medium for contact recording is that there should be no irregular protrusions higher than the flying height of the head. The so-called head crushing by such surface protrusions of a recording medium can be evaluated by a so-called glide test and the requirement mentioned above may be rephrased that the recording medium for contact recording must be able to pass a glide test at a lowest possible value. Since the head usually flies at a height of less than 760 Å, recording media for contact recording must be those which can pass a glide test at a lower height than the flying height of the head.

It is evident that textured discs of conventional types cannot be used for the purpose of contact recording because textures, after all, are scratches which are purposefully created for preventing adsorption of the head and include irregular bumps of about 1000 Å in height. Since these bumps are greater than the flying height of the head, head crushing is easily caused by these bumps. Even if the texturing process is omitted, the polished surface of an aluminum alloy substrate plated with Ni-P, for example, generally contains polisher traces such that, even if the average surface roughness ($R_a$) is as small as 100 Å, the maximum surface roughness ($R_{max}$) may be 500-1000 Å, the surface protrusions and indentations being far from uniform. This is not surprising, however, because it used to be considered important to prevent the adsorption of the head and the surface roughness was intentionally created on the non-magnetic substrate. Thus, there has been no need to polish the plated surface of Ni-P to a degree required for the purpose of contact recording. Conventionally, furthermore, the flying height of the head was generally greater than 1000 Å and there was no serious problem to be encountered even if the surface of the recording medium contained bumps of 1000 Å in height. If use is made of a substrate of an aluminum alloy for contact recording, therefore, care must be taken to reduce the polisher traces such that substrates capable of passing a glide test at 760 Å can be obtained.

Aforementioned Japanese Patent Publication Tokkai 52-20804 discloses a magnetic recording medium having a magnetic layer of Co-Ni-P plated over a mirror-polished Ni-P plated layer but the recording medium according to this reference is not appropriate for contact recording for many reasons. Firstly, since the average roughness ($R_a$) of its mirror-polished substrate surface is about 400 Å and its maximum roughness ($R_{max}$) is therefore thought to be 2000-4000 Å, this substrate cannot be considered appropriately polished for the purpose of contact recording. Secondly, it is considered essential to reduce as much as possible the gap between the magnetic layer and the magnetic head if it is desired to increase the recording density of the magnetic recording medium. The protective layer formed over the magnetic layer must also be made thinner than the conventional carbon coating (300-500 Å) and its thickness should be reduced ideally to zero, or at least to less than 200 Å. In reality, however, use is made of a polysilicate film as thick as 1000 Å as the protective layer and hence the separation between the magnetic layer of the recording medium and the magnetic head becomes disadvantageously large. Thirdly, the polysilicate film formed as a protective layer does not serve to reduce friction when it contacts the magnetic head. Fourthly, since the protective layer of an active polysilicate is formed directly on the magnetic layer, this active polysilicate tends to adversely affect the characteristics of the magnetic layer and hence the recording and reproducing characteristics of the recording medium as a whole. Fifthly, it is extremely difficult to form a thin polysilicate film of less than 200 Å in thickness uniformly and directly over a magnetic layer. Sixthly, the polysilicate protective layer is not reliably capable of stopping water which enters from its surface. Hence, the number of defects can increase within an atmosphere with high humidity, contributing to deterioration of the characteristics of the recording medium.

As for the magnetic recording medium according to aforementioned Japanese Patent Publication Tokkai 61-73227 having as protective layer a polysilicate film with hard particulates dispersed therethrough, it has the advantage of improved resistance against abrasion, and a lubricant layer can be more easily maintained thereon. Since use is made of a substrate with average surface roughness ($R_a$) of 200 Å and maximum surface roughness ($R_{max}$) in the range of 1000-2000 Å, however, it cannot be considered appropriate for contact recording. Additional disadvantages include, as above, that the protective layer of polysilicate is directly formed on the magnetic layer so as to adversely affect the recording and reproducing characteristics of the latter, that the protective layer is not reliably capable of stopping water which enters from its surface, and that it is extremely difficult to form a thin polysilicate film of less than 200 Å in thickness uniformly and directly over a magnetic layer.

Aforementioned Japanese Patent Application Tokugan 01-138095 discloses a magnetic recording medium having a glass or ceramic substrate with surface roughness ($R_{max}$) less than 100 Å but these substrate materials are fragile and hence the cost of fabrication becomes significantly higher than if a substrate of an aluminum alloy is used.

SUMMARY OF THE INVENTION

It is therefore an object of the present invention in view of the above to provide a magnetic recording medium with a high recording density which can be used for contact recording with the flying height of the head less than 760 Å.

It is another object of the present invention to provide such a magnetic recording medium with improved resistance against abrasion.

It is still another object of the present invention to provide such a magnetic recording medium having a magnetic layer which can be maintained in a chemically stable condition for a long period of time.

It is a further object of the present invention to provide such a magnetic recording medium with reliable recording characteristics.

It is still a further object of the present invention to provide such a magnetic recording medium of which the fabrication cost is not significant higher than that for conventional media using a substrate of an aluminum alloy.

A magnetic recording medium for contact recording with which the above and other objects of the present invention can be achieved may be characterized as having a layered structure including, from the bottom, (1) a substrate made of an aluminum alloy having a finished surface with maximum surface roughness $R_{max}$ between 100 Å and 300 Å and having no surface protrusions or unevenness higher than 760 Å, (2) a magnetic layer formed on this substrate either directly or through an underlying layer, (3) a first protective film of thickness 20-150 Å which is non-magnetic and formed on this magnetic layer, (4) a second protective film having hard particulates, for example, of alumina or silica with average diameter 50-300 Å dispersed in an inorganic oxide film, and (4) a lubricant film such that the magnetic recording medium has a maximum surface roughness of 100-300 Å, there being no surface protrusions and unevenness high than 760 Å, and hence is usable for contact recording with a recording head having flying height of less than 760 Å. According to a preferred embodiment, the first protective film may be of one or more metals, semiconductors, metallic compounds or semiconducting compounds, the inorganic oxide film of the second protective film is either silicon oxide or metallic oxide, parts of the second protective film not containing the particulates has thickness 20-200 Å, and the lubricant film has thickness 10-30 Å.

A method of manufacturing a magnetic recording medium for contact recording with which the aforementioned and other objects of the present invention can be achieved may be characterized by the steps of (1) providing a non-magnetic substrate of an aluminum alloy having a surface finished so as to have maximum surface roughness $R_{max}$ of 100-300 Å and having no surface protrusions or unevenness higher than 760 Å, (2) forming a magnetic layer directly or over an underlying layer on this substrate by sputtering, (3) forming on this magnetic layer a non-magnetic first protective film serving as a first protective layer, (4) coating this first protective film with a solution containing hard particulates and one or more of organosilic and/or organometallic compounds, (5) subjecting this coating solution to a heat treatment to form a second protective film having these particulates dispersed within an inorganic oxide film to serve as a second protective layer, (6) forming a lubricating film on this second protective film, and (7) removing surface protrusions from the medium by burnishing.

According to the present invention, the surface roughness of a magnetic recording medium can be reduced and a highly uniform medium surface can be obtained because use is made of a substrate with maximum surface roughness ($R_{max}$) smaller than 300 Å and, as a result, the flying height of the head at the time of write and read operations can also reduced. A stable dynamic characteristic of head-disc interface can be obtained and hence improved recording densities can be achieved. Although it is extremely difficult with the currently available surface processing technologies to reduce to less than 100 Å the maximum surface roughness of a substrate of an aluminum alloy processed with chromite or plated with Ni-P and although it is considered nearly impossible to produce such a substrate in a cost-effective manner, the present invention teaches that a medium for contact recording can be inexpensively manufactured by reducing its maximum surface roughness to 100-300 Å. Moreover, since the protective layer includes a first layer and a second layer, the first layer being a non-magnetic thin film between the magnetic layer and the second protective layer, deterioration of the magnetic recording medium can be effectively prevented.

Since the second protective layer, comprised of an inorganic oxide film and hard particulates dispersed therethrough, can have an area of thickness 20-200 Å not containing these particles and since the average diameter of the particulates can be 50–300 Å, for example, not only can the gap between the magnetic layer of the recording medium and the magnetic head be reduced and high-density recording become possible but also the maximum surface roughness of the recording medium can be reduced, for example, to 100–300 Å. Thus, the adsorption of the head can be prevented and a stable dynamic characteristic of the head can be achieved. The presence of these hard particulates such as silica and alumina particulates in the second protective layer has the favorable effect of improving the resistance against abrasion by the head. Moreover, since the second protective layer according to the present invention is porous and active, having microscopic surface protrusions and indentations due to these hard particles, it is capable of holding firmly the thin lubricant layer of thickness 10–30 Å formed thereon. The lubricant layer can therefore be maintained on the surface of the recording medium for a long period of time and since the holding force of the second protective layer on the lubricant layer is strong, the lubricant layer can be made thin. This is advantageous also from the point of view of the prevention of adsorption of the magnetic head.

A magnetic recording medium for contact recording must have a magnetic film (serving as the aforementioned magnetic layer) with certain specified characteristics. In order to obtain a magnetic film of a superior quality, it is important to control an underlying layer which affects the growth of such a magnetic film. When a magnetic film of CoNiPt or CoPt is formed by sputtering directly on an Al/Ni-P, it is possible to obtain an magnetic film having a high coercive force (coercivity) but an underlying layer of Cr or Cr containing small amounts of impurities is essential in the case of a magnetic film of other Co alloys such as CoNiCr, CoCrTa, CoNiZr and CoCrPt. This is because the length of the crystal lattice of the underlying Cr layer is nearly equal to that of the Co alloy and the Cr layer plays an important role of improving the lattice orientation of the magnetic film. Magnetic recording media with superior characteristics with improved recording densities can be obtained by further inserting one or more layers comprising materials such as Cr, Ti, W, Ta, Mo, Zr, Cu, Al, Zn, In, Sn and their alloys such as TiW between this underlying Cr layer and the substrate. In what follows, the entire portion of the magnetic recording medium according to the present invention, which lies between the substrate and the magnetic layer, will be referred to either as "an underlying layer" although itself may comprise more than one layer, or as "and underlying component" (such as "a double-layered underlying component" if it includes two films of different materials). In other words, the expression "underlying layer" is not intended to be interpreted as meaning a single-level structure but a sheet-like component which may be single-layered or multiple-layered.

It is also extremely important to control the production process if it is desired to obtain a medium, such as the magnetic recording medium for contact recording according to the present invention, having high surface uniformity and a surface condition with no irregular bumps or protrusions. It is to be noted that the thin films of a magnetic recording medium according to the present invention, except the second protective layer, can be formed continuously by sputtering. Since the second protective layer contains hard particulates, it cannot be replaced, for example, by a silicate film formed by sputtering. The advantages of forming the underlying layer, the magnetic layer and the first protective layer continuously by using a single sputtering apparatus include the following:

(1) The film thickness and characteristics of each layer can be accurately controlled, (2) Smooth and uniform films can be deposited, (3) As compared to the plating method with mutually independent individual steps, the occurrence of defects caused by dust particles generated during the handling between the steps as well as during the steps themselves can be reduced, and (4) Because the handling steps can be omitted and the yield is high, the cost of production can be lowered.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 1–3 are partially enlarged schematic sectional views of three magnetic recording media, each embodying the present invention, FIG. 4 is a graph showing the effects of baking temperature on the coercivity of both magnetic recording media embodying the present invention and those manufactured for comparison, and FIG. 5 is a graph showing the changes with time in the numbers of defects on the surfaces of magnetic recording media embodying and not embodying the present invention.

DETAILED DESCRIPTION OF PREFERRED EMBODIMENTS

In what follows, the present invention will be described further in detail by way of examples and drawings but it goes without saying that these examples are not intended to limit the scope of the present invention.

EXAMPLE 1

A magnetic recording medium, of which a partially enlarged schematic sectional view is shown in FIG. 1, was manufactured as follows.

First, a disk-shaped substrate 1 of outer diameter 95 mm$\phi$ and thickness 1.27 mm made of a base plate 10 of an aluminum alloy plated with Ni-P 11 and having a center hole of diameter 25 mm$\phi$ was prepared and carefully finished in an extremely clean atmosphere by using a colloidal alumina solution and a long-legged polisher so as to reduce the maximum surface roughness ($R_{max}$) to 180 Å. In this Example, the Ni-P plating 11 is functionally not considered as the underlying layer for the magnetic layer (to be formed thereon) but as a part of the substrate 1 because its main function is to harden the surface of the aluminum alloy and to thereby improve the impact resistance of the substrate 1.

Next, this Al/Ni-P substrate 1 was set inside a sputtering apparatus after its surface was carefully finished. An underlying layer 2 of a Cr film with film thickness 1500 Å was formed by a DC magnetron sputtering method by using a Cr target and an Ar gas, and a magnetic layer 3 of a CoNiCr film with thickness 550 Å was formed immediately thereafter by a similar sputtering method by using a CoNiCr target. Still thereafter, a Cr target was used to continuously form a first protective layer 4 of a Cr film of thickness 50 Å by sputtering inside the same sputtering apparatus.

Next, the surface of the first protective layer 4 was coated by a spin-coating process with a mixture of tetra-ethoxy silane ($Si(OC_2H_5)_4$) as an organosilic compound, silica particulates with average diameter of about 100 Å, water and isopropyl alcohol at weight ratio of 10:0.3:3:500 so as to form a thin film. By the "average diameter" of the silica particulates is meant the average of the measured sizes of all sampled silica particulates, inclusive of not only spherical ones but also those which are not spherical at all. This thin film, thus formed from an organosilic compound solution containing silica particulates, was heated next at a baking temperature of about 250° C. for two hours to form a second protective film 5 which contains silica particulates 7 dispersed inside a silicon oxide (polysilicic acid) film 6 and of which a part not containing any silica particulates has thickness of 100 Å. This second protective film 5 and the aforementioned first protective film 4 are together referred to as the protective layer of the magnetic recording medium according to this embodiment of the present invention.

Thereafter, a lubricant (such as AM2001 produced by Montedison Co.) comprised of perfluoro polyether was applied on the second protective film 5 through a dip-lubing process to form a lubricant layer 8 of thickness 20 Å and to thereby obtain a magnetic recording medium according to this embodiment of the present invention. A burnishing head was used to remove protrusions from its surface and its surface roughness ($R_{max}$), as measured by a roughness-measuring apparatus (Talystep produced by Rank Taylor Hobson Co. of England), was 150 Å, passing a glide test at 760 Å. According to a contact-start-stop (CSS) test with a magnetic head having a sintered member of $Al_2O_3$—TiC as a slider static friction was less than 0.5 after 50,000 tests, indicating a superior resistance against abrasion. Its magnetic characteristics were good as measured at a flying height of 760 Å, allowing a high-density recording of more than 45 KBPI (kilobit/inch).

Next, five additional recording media of different specifications were produced similarly as described above except, after the first protective layer 4 of Cr was formed on the magnetic layer 3,, the thin film of tetra-ethoxy silane solution applied thereon was subjected to a heat treatment at room temperature, 150° C., 200° C., 275° C. and 300° C. instead of 250° C. as above) to form the second protective film 5. The magnetic coercive force (or coercivity $H_c$) was measured on these five magnetic recording media thus obtained as well as the medium obtained above with a heat treatment at 250° C., that is, on a total of six samples). These measured values were compared with those obtained from six comparison samples which were produced similarly as described above except the first protective layer 4 of Cr was not included. The results of this comparison are shown in FIG. 4. One learns from FIG. 4 that coercivity of a magnetic recording medium embodying the present invention hardly drops even if the baking temperature of the heat treatment for the tetra-ethoxy silane solution containing silica particulates is raised, say, to 275° C. although that of the comparison samples without the first protective film drops significantly as the baking temperature is increased. This is a clear demonstration of the technological significance of providing a magnetic recording medium of the present invention with a first protective film. It is noted that coercivity drops significantly at 300° C., independently of whether the first protective layer is provided or not. This is because the plated Ni-P layer begins to crystalize and become magnetic. This implies that the Al/Ni-P substrate 1 according to the embodiment described above must be subjected to a heat treatment at a temperature lower than 300° C. The maximum allowable baking temperature for the heat treatment naturally depends on the characteristics of the plated Ni-P layer 11.

A further test was carried out (by using Media Certifier RD008 manufactured by Adelphi Corporation of the United States) to compare the time rates of change in the number of defects when a recording medium embodying the present invention (with the tetra-ethoxy silane solution heat-treated at 250° C.) and a comparison medium (also heat-treated at 250° C.) were stored in a high-temperature (80° C.) and high-humidity (85%) environment. The results of this comparison test are shown in FIG. 5. One easily learns from FIG. 5 that hardly any defects become observable on the medium embodying the present invention even after it is stored for an extended period of time in such a high-temperature, high-humidity environment while defects are seen not only to appear on the comparison medium within a relatively short period of time under similar environmental conditions but also to increase rapidly with time. This test additionally provides a technological significant of the presence of the first protective film.

EXAMPLE 2

A magnetic recording medium, of which a partially enlarged schematic sectional view is shown in FIG. 2, was manufactured as follows.

As in Example 1, the surfaces of a disk-shaped substrate 1 comprised of a base plate 10 of an aluminum alloy plated with Ni-P 11 were carefully finished by using a colloidal alumina solution so as to reduce its maximum surface roughness ($R_{max}$ to 180 Å. A magnetic layer 13 of CoNiPt with thickness 500 Å was formed on each of the two principal surfaces through a RF magnetron sputtering process. Next, after a first protective layer 14 of Ti with thickness 30 Å was formed on this magnetic layer 13 through a DC magnetron sputtering process, a second protective layer 15 was formed as follows.

A mixture of tetra-i-propoxy titanate ($Ti(OC_3H_7)_4$) as an organometallic compound, alumina particulates of average diameter 200 Å, water, n-butyl alcohol and acetic acid was prepared at weight ratio of 1:0.002:0.1:100:0.01 and the substrate 1 having the first protective layers 14 formed thereon was immersed in this solution for one minute. Thereafter, the substrate 1 was gradually pulled out of the solution at a rate of about 10 cm/minute to form on the first protective layer 14 a thin film of an organic titanium compound containing alumina particulates. Next, the substrate 1 was heated for one hour at about 275° C. to form a second protective film 15 which contains alumina particulates 17 dispersed inside an titanium oxide film 16 and of which the part not containing any alumina particulates has thickness of 150 Å. A magnetic recording device of Example 2 is thereafter completed by applying a lubricant (such as Krytox 157FSL produced by Du Pont) comprising perfluoro polyether on the second protective film 15 through a dip-lubing process to form a lubricant layer 18 of thickness 15 Å. The second protective film 15 and the aforementioned first protective film 14 are again referred to together as the protective layer of the magnetic recording medium thus completed.

As in Example 1, a burnishing head was used to remove protrusions from this magnetic recording medium. Its surface roughness ($R_{max}$), as measured similarly by Talystep produced by Rank Taylor Hobson Co. of England, was 220 Å and the medium passed a glide test at 760 Å. The results of a contact-start-stop (CSS) test thereon were also good and the coefficient of friction was 0.4 after 50,000 tests. Its magnetic characteristics were as good as those of Example 1.

In order to further ascertain the technological significance of providing the first protective film 14, effects on coercivity from the temperature in the heat treatment as well as the number of defects caused by the length of storage period were compared and evaluated. Results obtained by these tests were similar to those obtained with Example 1.

EXAMPLE 3

A magnetic recording medium of Example 3 is similar to that of Example 1 and hence is described below by way also of FIG. 1. Example 3 is distinguishable from Example 1 in that the first protect layer 4 comprises a Si film, rather than a Cr film, of thickness 50 Å. This Si film was formed, after the formation of the magnetic layer 3 of CoNiCr, through a RF magnetron sputtering process inside the same sputtering chamber. The medium of Example was thereafter formed by forming as second protective film 5 and a lubricant film 8 as explained above in connection with Example 1. Since silicon is more wettable by the solution used for the formation of the second protective film 5, a protective film superior in uniformity can be produced easily. Silicon is not only capable, as first protective film, of preventing deterioration of the magnetic layer but also strongly adhesive to the second protective film 5. It thus serves as a protective layer with high mechanical durability.

EXAMPLE 4

A magnetic recording medium, of which a partially enlarged schematic sectional view is shown in FIG. 3, was manufactured as follows.

A disk-shaped Al/Ni-P substrate 1 with surface roughness ($R_{max}$) 100–300 Å was prepared first as in Example 1 and a double-layered underlying component with a TiW film 21 of thickness 500 Å and a Cr film 22 of thickness 1500 Å. was formed sequentially thereon through a DC magnetron sputtering process. The TiW film 21, which thus forms a part of the underlying layer, proved to be effective in uniformizing magnetic characteristics such as modulation.

Next, a magnetic layer 23 of CoCrTa with thickness 650 Å was formed on the Cr film 22 through DC magnetron sputtering and a first protective film 24 of TiW with thickness 50 Å was formed further thereon. Thereafter, a silicon oxide layer 26 containing silica particulates 27 is formed as second protective layer 25 and a lubricating film 28 is applied as in Example 1 to obtain a magnetic recording medium of Example 4. The first protective film of TiW is capable of preventing deterioration of the magnetic layer. Good CSS test results are obtained due to the combination of the first and second protective films. The magnetic recording medium of this example, therefore, has high mechanical durability.

The foregoing description of preferred embodiments of the invention has been presented for purposes of illustration and description. It is not intended to be exhaustive or to limit the invention to the precise form disclosed, and many modifications and variations are possible in light of the above teaching. Such modifications and variations that are intended to be within the scope of this invention include the following.

Although tetra-ethoxy silane, as an example of organosilic compound, was used in Example 1 as the material for forming the film 6 of silicon oxide as its second protective film 5, use may equally well be made of its partial or total hydrolyzate. Use may further be made of other silicon alkoxides or their partial or total hydrolyzates as long as they form silicon oxide by a so-called sol-gel method. Examples of such silicon alkoxide include tetra-alkoxy silanes such as tetra-methoxy silane, tetra-n-propoxy silane, tetra-i-propoxy silane, tetra-n-butoxy silane, tetra-sec-butoxy silane and tetra-tert-butoxy silane, silicon alkoxides such as monoalkyl tri-alkoxy silane, di-alkyl di-alkoxy silane and tri-alkyl mono-alkoxy silane with 1–3 alkoxy groups of these tetra-alkoxy silane substituted by alkyl groups and their partial and total hydrolyzates.

Similarly, although tetra-i-propoxy titanate, as an example of organometallic compound, was used in Example 2 as the material for forming the second protective film comprising a metal oxide film made from titanium oxide, use may equally well be of its partial or total hydrolyzate. Use may further be made of other titanium alkoxides or their partial or total hydrolyzates as long as they form titanium oxide by a sol-gel method. Examples of such titanium alkoxide include tetra-alkoxy titanates such as tetra-methoxy titanate, and tetra-n-butoxy titanate. Moreover, the metal oxide film may equally well be formed by using an organometallic compound besides titanium alkoxide such as alkoxides of tantalum, tungsten, tin, zirconium and aluminum as well as their partial or total hydrolyzates. A film of silicon oxide or a metal oxide such as oxides of titanium, tantalum, tungsten, tin, zirconium and aluminum can be formed by any method other than the aforementioned sol-gel method using silicon alkoxide or metal alkoxide. A metal oxide film may be formed by using two or more kinds of metal oxide. It may even be an inorganic oxide film containing both silicon and metal oxides. Although a mixture of tetra-i-propoxy titanate, water, methyl alcohol and acetic acid was used in Example 2 to form a metal oxide film comprising titanium oxide, the inclusion of acetic acid is not essential. A solution containing a hydrolyzate of silicon alkoxide or metal alkoxide may be obtained without using water affirmatively but merely by taking water (vapor) in from the atmosphere. Although isopropyl alcohol and n-butyl alcohol were used in Examples 1 and 2, ethyl alcohol and methyl alcohol may be used instead.

Although silica particulates were dispersed in a silicon oxide film in Example 1 and alumina particulates were dispersed in a metal oxide film in Example 2, use may equally well be made of inorganic particulates of other kinds as long as they are hard. Examples include particulate of zirconia, titania, lithium oxide, magnesium oxide, strontium oxide, cesium oxide, zinc oxide and barium oxide. Two or more different kinds may be used.

Although the average diameter of the silica particulates in Example 1 was 100 Å and that of the alumina particulates in Example 2 was 200 Å, it is generally preferable that the average diameter of the particulates be within the range of 50–300 Å. Within this range, particulates of two or more kinds each having a different average diameter may be mixed together. If the average diameter is in this range, the surface roughness ($R_{max}$) of the recording medium can be easily adjusted to 100–300 Å. If the surface roughness is less than 100 Å, adsorption of the magnetic head may take place while, if it exceeds 300 Å, the movement of the head of the medium becomes unstable, tending to cause a head crush and adversely affecting the magnetic recording and reproducing characteristics. Since variations with time in the distance between the magnetic layer and the head (by the oscillations of the disc, for example) influence the magnetic characteristics seriously especially in the case of contact recording, it is important to prevent the surface roughness of the medium from exceeding 300 Å.

The thickness of the part of the second protective layer not containing hard particulates was 100 Å in Example 1 and 150 Å in Example 2. The preferred range for this thickness according to the present invention is 20–200 Å. If this thickness is less than 20 Å, the inorganic oxide film becomes too thin and weak to be able to hold the hard particulates and the CSS durability is adversely affected. If this thickness is greater than 200 Å, on the other hand, there arises the problem of so-called spacing loss, of ill-effects on the signal intensity and/or quality due to the distance between the head and the magnetic layer. The aforementioned range is desirable also for the convenience of obtaining the surface roughness ($R_{max}$) of 100–300 Å while using hard particulates with average diameter of 50–300 Å.

Although use was made of substrates of an aluminum alloy plated with Ni-P in Examples 1–4, the aluminum alloy may be processed by anodization. Such substrates can also be polished in a finishing process until their surface roughness ($R_{max}$) becomes less than 300 Å. Although magnetic layers of CoNiCr, CoCrTa and CoNiPt were used respectively in Examples 1 and 3, in Example 4 and in Example 2, other Co alloys such as CoNiZr, CoCrPt, CoPt, CoNiP and CoP as well as a magnetic material such as $Fe_2O_3$ may be used for forming the magnetic layer. As for the underlying layer, although a Cr film and films of TiW and Cr were used respectively in Example 1 and in Example 4, other materials that may be used for this purpose include non-magnetic materials such as Mo, Ti, Ta, W, Zr, Cu, Al, Zn, In, Sn, and their alloys. Although films of Cr, Ti, Si and TiW were used as the first protective layer respectively in Examples 1, 2, 3 and 4, use may be made equally well of a non-magnetic material such as Mo, Ta, W and Ge or a non-magnetic thin film comprising their oxide, nitride or carbide. Alternatively, two or more of these non-magnetic thin films may be used in layers. The preferred range for the thickness of the first protective layer is 20–150 Å. If this thickness is less than 20 Å, deterioration in the characteristics of the magnetic layer cannot be adequately prevented. If it exceeds 150 Å, on the other hand, there arises the problem of spacing loss. As for the material for the lubricant film, perfluoro polyether was used in Examples 1 and 2 but use may be made equally well of a fluorocarbon liquid lubricant or a lubricant containing an alkali metal salt of sulfonic acid. Its preferred thickness is 10–30 Å because a lubricant film with thickness less than 10 Å cannot improve resistance against abrasion and, if the thickness exceeds 30 Å, adsorption of the head may occur, depending on the surface roughness. Although methods by DC and RF magnetron sputtering were disclosed above, basically the same film characteristics are obtained by either of these methods. In the case of RF magnetron sputtering on both surfaces, care must be taken to prevent the plasma interference. For forming a thin film such as the first protective film, a process of DC or RF sputtering without the use of a magnet can be used.

What is claimed is:

1. In a magnetic recording medium for contact recording having a magnetic layer, a protective layer and a lubricant layer sequentially stacked on a non-magnetic substrate of an aluminum alloy, the improvement wherein said magnetic recording medium also includes an underlying component between said substrate and said magnetic layer, said underlying component comprising a Cr film and one or more non-magnetic layers selected from Ta, Mo, Zn, Sn and alloys consisting of one or more elements selected from the group consisting of Ta, Mo, Zn and Sn and formed on said substrate, said Cr film being formed between said one or more non-magnetic layers and said magnetic layer, said substrate has a finished surface with maximum surface roughness $R_{max}$ between 100 Å and 300 Å, having no surface protrusions or unevenness higher than 760 Å, said protective layer includes a first protective film and a second protective film, said first protective film being non-magnetic and formed on said magnetic layer and including one or more selected from the group consisting of metals, semiconductors, metallic compounds, and semiconducting compounds, said second protective film including an inorganic oxide film and particulates dispersed within said inorganic oxide film, said inorganic oxide film comprising at least one oxide selected from the group consisting of silicon oxides and metallic oxides, and a lubricant film is formed on said protective layer, the maximum surface roughness $R_{max}$ of said magnetic recording medium being 100–300 Å, said magnetic recording medium having no surface protrusions and unevenness higher than 760 Å;

wherein said magnetic recording medium is usable for contact recording with a recording head having flying height of less than 760 Å.

2. The magnetic recording medium of claim 1 wherein said first protective film has a thickness 20–150 Å, said second protective film has particulate-free parts which do not contain any of said particulates, said particulate-free parts of said second protective film have thickness 20–200 Å, the average diameter of said particulates is 50–300 Å, and said lubricant film has thickness 10–30 Å.

3. The magnetic recording medium of claim 1 wherein said first protective film is a single film comprising a semiconductor selected from silicon and germanium.

4. The magnetic recording medium of claim 2 wherein said first protective film is a single film comprising a semiconductor selected from silicon and germanium.

5. The magnetic recording medium of claim 1 wherein said first protective film includes a metallic film and a semiconductor film selected from a silicon film and a germanium film.

6. The magnetic recording medium of claim 2 wherein said first protective film includes a metallic film and a semiconductor film selected from a silicon film and a germanium film.

7. The magnetic recording medium of claim 1 wherein said Cr film and said non-magnetic layer serve to improve recording densities of said medium.

8. The magnetic recording medium of claim 1 wherein said substrate includes a Ni-P layer formed on an aluminum alloy.

9. The magnetic recording medium of claim 1 wherein said particulates are substantially as hard as silica.

10. The magnetic recording medium of claim 1 wherein said particulates are substantially as hard as alumina.

11. In a magnetic recording medium for contact recording having a magnetic layer, a protective layer and a lubricant layer sequentially stacked on a non-magnetic substrate of an aluminum alloy, the improvement wherein said magnetic recording medium also includes an underlying component between said substrate and said magnetic layer, said underlying component comprising a Cr film and a TiW film formed on said substrate, said Cr film being formed between said TiW film and said magnetic layer, said substrate has a finished surface with maximum surface roughness $R_{max}$ between 100 Å and 300 Å, having no surface protrusions or unevenness higher than 760 Å, said protective layer includes a first protective film and a second protective film, said first protective film being non-magnetic and formed on said magnetic layer and including one or more selected from the group consisting of metals, semiconductors, metallic compounds, and semiconducting compounds, said second protective film including an inorganic oxide film and particulates which are harder than and dispersed with said inorganic oxide film, said inorganic oxide film comprising at least one oxide selected from the group consisting of silicon oxides and metallic oxides, and a lubricant film is formed on said protective layer, the maximum surface roughness $R_{max}$ of said magnetic recording medium being 100–300 Å, said magnetic recording medium having no surface protrusions and unevenness higher than 760 Å;

wherein said magnetic recording medium is usable for contact recording with a recording head having flying height of less than 760 Å.

12. The magnetic recording medium of claim 11 wherein said first protective film has thickness 20–150 Å, said second protective film has particulate-free parts which do not contain any of said particulates, said particulate-free parts of said second protective film have thickness 20–200 Å, the average diameter of said particulates is 50–200 Å, and said lubricant film has thickness of 10–30 Å.

13. The magnetic recording medium of claim 11 wherein said first protective film is a single film comprising a semiconductor selected from silicon and germanium.

14. The magnetic recording medium of claim 12 wherein said first protective film is a single film comprising a semiconductor selected from silicon and germanium.

15. The magnetic recording medium of claim 11 wherein said first protective film includes a metallic film and a semiconductor film selected from a silicon film and a germanium film.

16. The magnetic recording medium of claim 12 wherein said first protective film includes a metallic film and a semiconductor film selected from a silicon film and a germanium film.

17. The magnetic recording medium of claim 11 wherein said particulates comprise silica.

18. The magnetic recording medium of claim 11 wherein said particulates comprise alumina.

* * * * *